Dec. 21, 1954  O. W. SMITH  2,697,614
TANDEM TRAILER DEVICE
Filed April 2, 1951  3 Sheets-Sheet 2
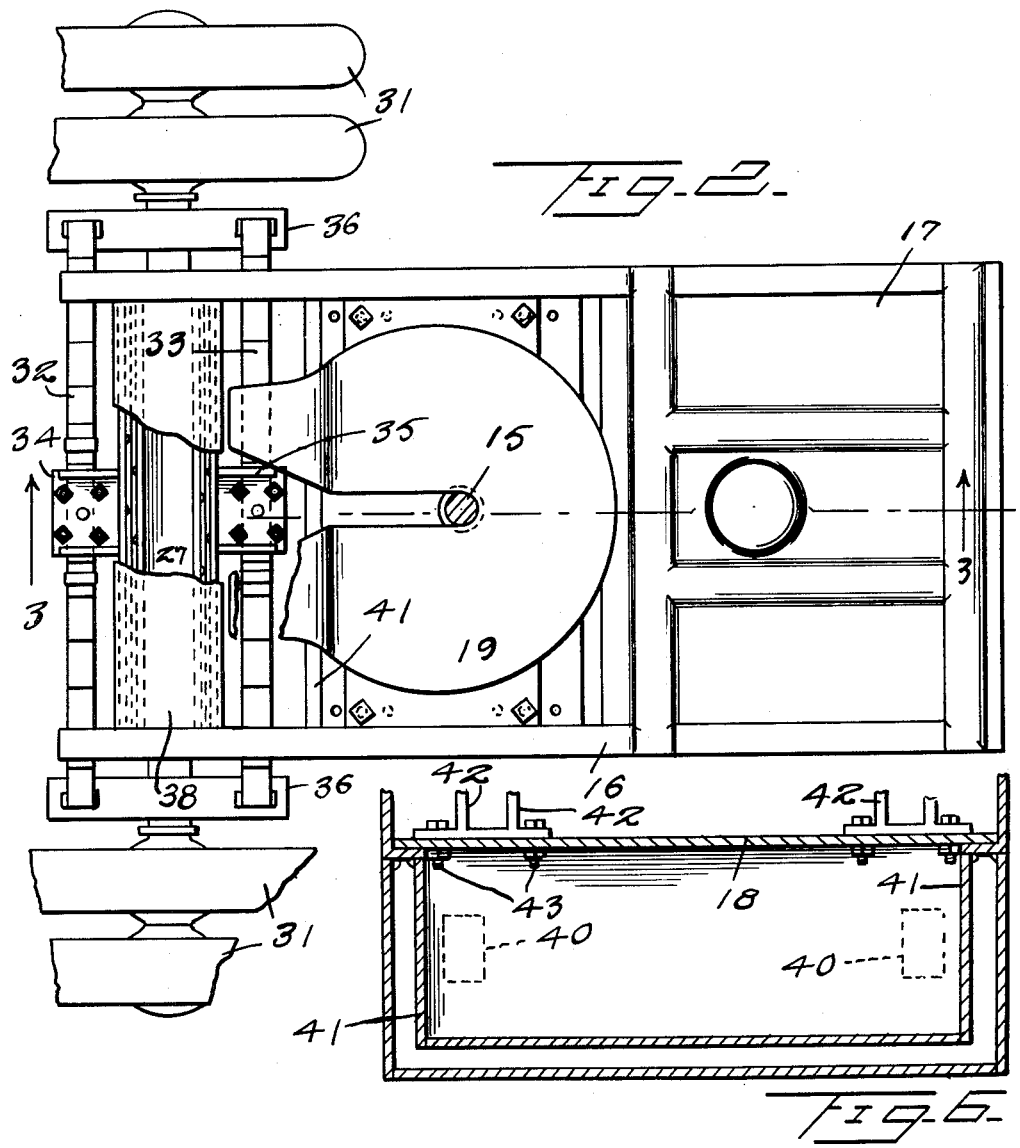
INVENTOR
Otho W. Smith
BY
Kimmel & Crowell  ATTORNEYS Dec. 21, 1954  O. W. SMITH  2,697,614
TANDEM TRAILER DEVICE
Filed April 2, 1951  3 Sheets-Sheet 3
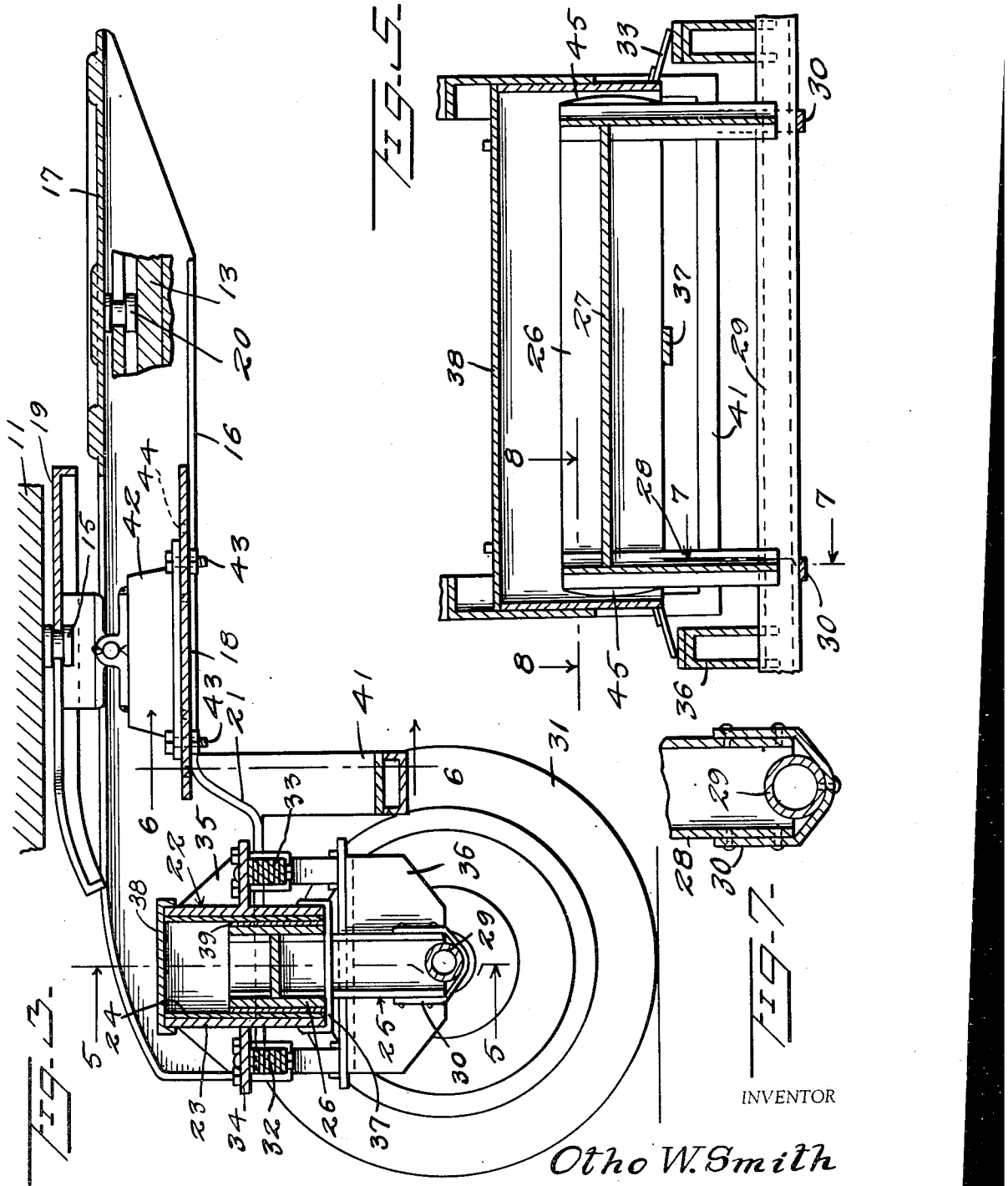
INVENTOR
Otho W. Smith
BY Kimmel & Crowell
ATTORNEYS United States Patent Office 2,697,614
Patented Dec. 21, 1954

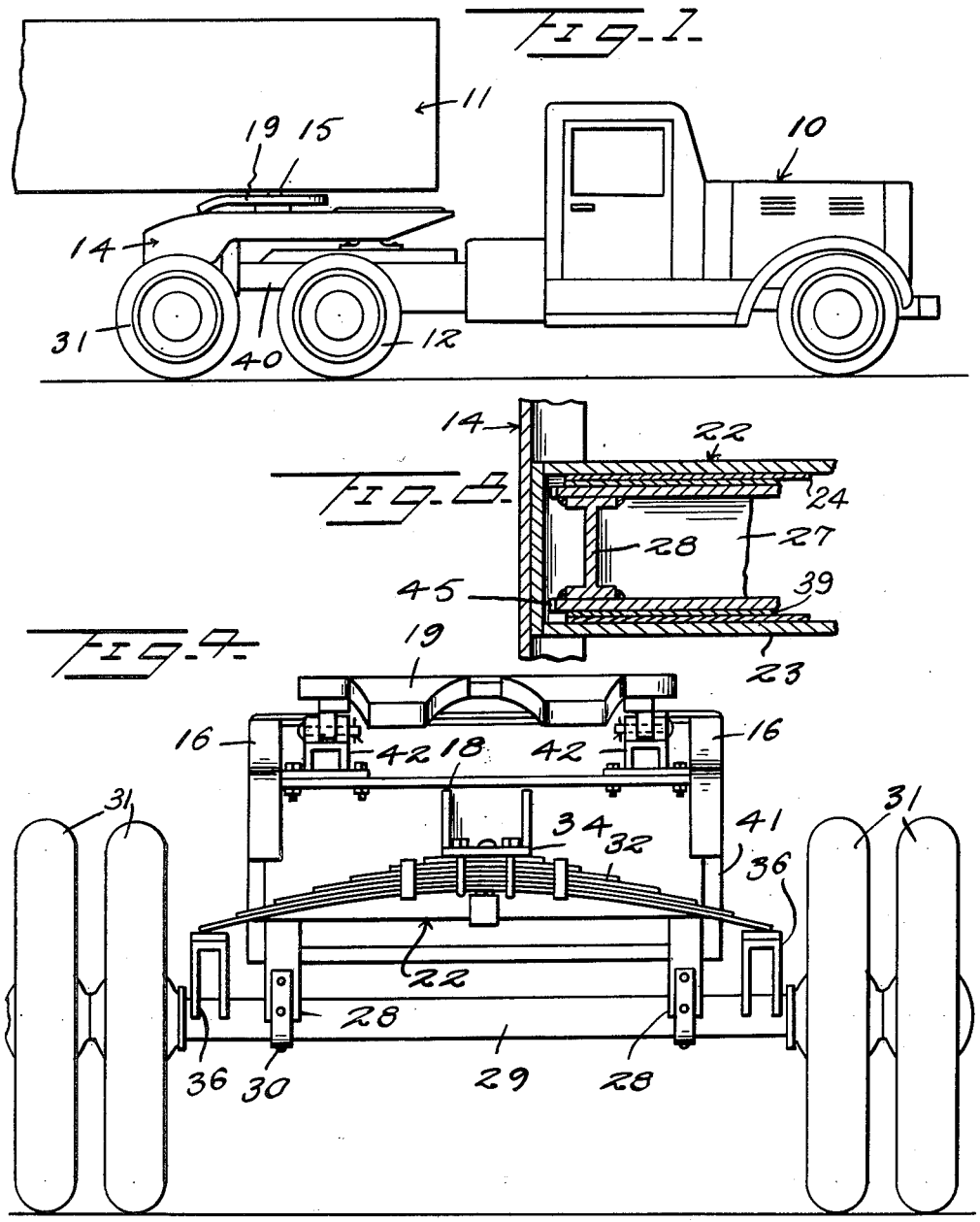

2,697,614

TANDEM TRAILER DEVICE

Otho W. Smith, Bedford, Ind.

Application April 2, 1951, Serial No. 218,748

1 Claim. (Cl. 280—423)

This invention relates to a dolly construction adapted to be interposed between a tractor and trailer, and is an improvement over the construction embodied in my co-pending application Serial No. 156,783, filed April 19, 1950, now Patent No. 2,643,890, issued June 30, 1953, for Tandem Trailer Device.

An object of this invention is to provide a detachable dolly structure for interposing between a tractor and a trailer which will relieve the tractor of a substantial portion of the trailer load.

Another object of this invention is to provide a detachable dolly structure which includes complementary fifth wheel coupling means for connection with the fifth wheel elements carried by the tractor and trailer.

A further object of this invention is to provide a detachable dolly structure having complementary fifth wheel coupling means including means whereby the dolly structure will be held against turning relative to the tractor so that the tractor and trailer may be backed up without danger of jackknifing.

A further object of this invention is to provide a dolly structure adapted to be interposed between a tractor and trailer which will increase the axle bearing capacity so that additional weight may be carried in the trailer without violating local regulations as to axle load limit. It is well known that different states have different regulations as to load limits and that the load limits are based on the axle bearing capacity. The present invention will provide an additional axle bearing so that a given load which might be within the limit of one state and in excess of the limit of another state will be well within the lower limit of such other state.

With the above and other objects in view, my invention consists in the arrangement, combination and details of construction disclosed in the drawings and specification, and then more particularly pointed out in the appended claim.

In the drawings:

Figure 1 is a detailed side elevation of a tractor and trailer having a tandem trailer or dolly constructed according to an embodiment of this invention interposed between the tractor and trailer.

Figure 2 is a plan view partly broken away of the dolly structure.

Figure 3 is a sectional view taken on the line 3—3 of Figure 2.

Figure 4 is a rear elevation of the dolly structure.

Figure 5 is a fragmentary sectional view taken on the line 5—5 of Figure 3.

Figure 6 is a fragmentary sectional view taken on the line 6—6 of Figure 3.

Figure 7 is a fragmentary sectional view taken on the line 7—7 of Figure 5.

Figure 8 is a fragmentary sectional view taken on the line 8—8 of Figure 5.

Referring to the drawings, and, first, to Figures 1 to 8, inclusive, the numeral 10 designates generally a conventional tractor vehicle, and the numeral 11 designates generally a conventional trailer vehicle which is coupled to the tractor vehicle 10 as will be hereinafter described.

In order to provide a means whereby the load of the trailer vehicle 11 will be taken partially from the rear wheels 12 of the tractor vehicle 10, I have provided a dolly structure generally designated as 14 which is detachably connected between the fifth wheel 13 of the tractor 10 and the coupling pin 15 of the trailer vehicle 11. The dolly or tandem trailer device 14 comprises a frame formed of a pair of channel shaped side members 16 which are connected together adjacent the forward ends thereof by means of a plate 17. A rear plate 18 is connected between the channel frame members 16 rearwardly of the connecting plate 17, and the rear plate 18 has rockably mounted thereon a fifth wheel 19 which projects above the forward or upper plate 17.

The fifth wheel member 19 is adapted to be engaged by the coupling pin 15 of the trailer vehicle 11, and the pin 15 is adapted to be locked with respect to the fifth wheel 19 in any conventional manner. The top and forward plate 17 has secured to and projecting from the lower side thereof a coupling pin 20 which engages with the fifth wheel 13 and is adapted to be locked against horizontal movement with respect to the fifth wheel 13 in a conventional manner.

The frame members 16 are formed with downwardly offset rear portions 21, and a box or bolster guide 22 is fixed between the rear portions of the offset members 21. The box or bolster guide 22 is formed of spaced apart upright plates 23 secured between the rear end of the frame member 16 and the offset portions 21 and projecting downwardly below the offset portions 21 as shown in Figure 3.

The inner sides of the plates 23 have fixed thereto wear plates 24, the purpose for which will be hereinafter described. A bolster or plunger generally designated as 25 slidably engages within the guide or box 22 and comprises a pair of vertically disposed side plates 26 connected together by a webbing 27.

A pair of vertically disposed I members 28 are secured and extend downwardly from the plates 26 and are fixed to a horizontally disposed axle 29 by means of a strap 30 or other suitable fastening means.

The axle 29 has a pair of wheels 31 disposed at each end thereof, and a pair of bowed or semi-elliptical spring assemblies 32 and 33 are disposed on the rear and forward sides of the box or guide 22 being secured to brackets 34 and 35, respectively. The axle 29 has fixed thereto inwardly from the wheels 31 upstanding U-shaped spring engaging members 36 against which the opposite ends of the springs 32 and 33 are adapted to slidably engage.

In order to prevent the bolster or plunger 25 from dropping out of the guide or box 22 a strap member or bar 37 is fixed across the lower end of the guide or box 22 between the depending I arms 28. The box or guide 22 has mounted on the upper end thereof a flanged cover 38 so as to prevent dirt or foreign material from entering the box or guide 22. The bolster or plunger 25 has fixed to the outer side of the plates 26 wear plates 39 which confront the wear plates 24 and slidably bear against the wear plates 24.

The tractor vehicle 10 includes a frame 40 projecting rearwardly from the rear wheels 12 and rearwardly projecting portions of the frame 40 loosely engage in a U-shaped tubular saddle 41 which is fixed to the rear portion of the side frame members 16. The saddle 41 is adapted to hold the dolly structure 14 against swinging movement with respect to the fifth wheel 13 and the tractor 10 so that the tractor 10 with the trailer 11 and the dolly 14 interposed therebetween will not jackknife when the tractor and trailer are backed up. The saddle 41 also prevents undue side swinging movement of the dolly structure during the forward movement of the tractor and trailer.

The mountings 42 for the fifth wheel 19 are secured to plate 18 by fastening members 43 which engage through selected openings 44 in plate 18 so that the weight of the trailer 11 may be adjusted lengthwise of the frame 16. At a mid-point between the tractor wheels 12 and wheels 31 the trailer weight will be evenly distributed, whereas forward adjustment of the bearing mounts 42 will place a greater weight of the trailer on the tractor wheels 12 and thereby provide greater traction to wheels 12. Rearward adjustment of mountings 42 will place a greater trailer weight on wheels 31.

The opposite ends of bolster 25 are rounded as indicated at 45, and these rounded ends 45 are normally spaced from the ends of guide 22 so that the bolster may tilt relative to the guide 22 when one wheel 31 passes over an obstruction.

What is claimed is:

A dolly for interposing between the fifth wheel connections of a tractor and trailer comprising a horizontal frame, a fifth wheel coupling means carried by the forward end of said frame, a fifth wheel carried by said frame rearwardly of said coupling means and adapted to be engaged by the fifth wheel coupling means of the trailer, an axle at the rear of said frame, wheels on said axle, a bolster connected between said axle and frame, said bolster comprising a pair of vertical guide plates fixed between the sides of said frame, an H-shaped slide slidably engaging between said guide plates, a pair of downwardly projecting bars fixed to said slide, means securing the lower ends of said bars to said axle, front and rear horizontal flanges carried by said guide plates, a pair of bowed springs, means securing said springs to said flanges, front and rear pairs of inverted U-shaped members fixed to said axle and engageable by the outer ends of said springs, and a connecting bar fixed between the lower edges of said guide plates and engaging beneath said slide to limit the downward movement of said slide.

References Cited in the file of this patent

UNITED STATES PATENTS

| Number | Name | Date |
|---|---|---|
| 869,583 | Macfarren | Oct. 29, 1907 |
| 1,804,089 | Cochran | May 5, 1931 |
| 2,126,819 | Schawlem | Aug. 16, 1938 |
| 2,161,219 | Abell | June 6, 1939 |
| 2,167,125 | Pflager | July 25, 1939 |
| 2,330,897 | Kirksey | Oct. 5, 1943 |
| 2,351,151 | Sattler | June 13, 1944 |
| 2,445,134 | Currell, Jr. | July 13, 1948 |
| 2,495,943 | Peterson | Jan. 31, 1950 |
| 2,517,940 | Stuart | Aug. 8, 1950 |